June 2, 1931.  F. J. BRADLEY  1,807,685
BRAKE EQUALIZER AND OPERATING DEVICE
Filed May 7, 1928
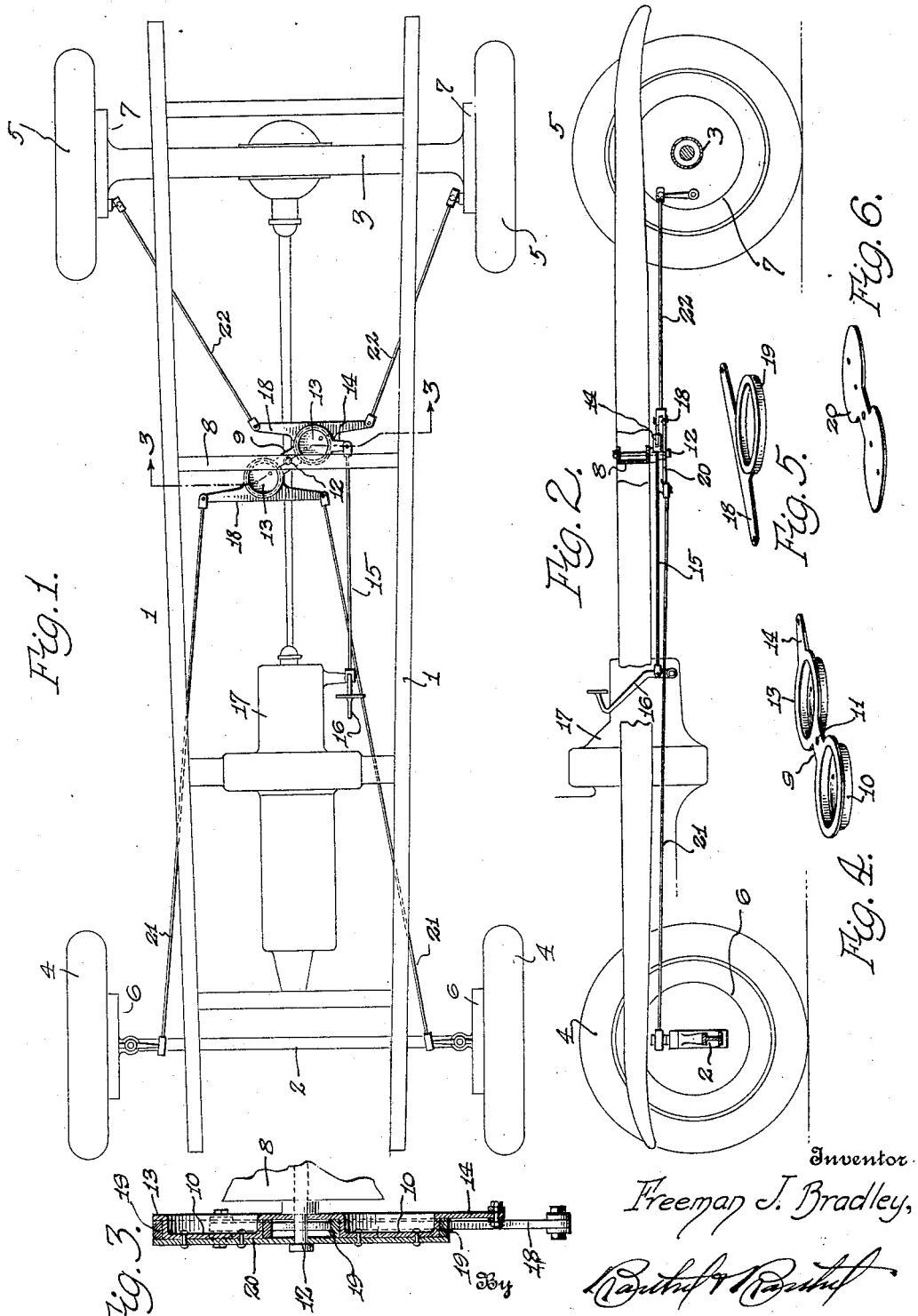
Inventor
Freeman J. Bradley,
Attorneys Patented June 2, 1931

1,807,685

UNITED STATES PATENT OFFICE

FREEMAN J. BRADLEY, OF YPSILANTI, MICHIGAN

BRAKE EQUALIZER AND OPERATING DEVICE

Application filed May 7, 1928. Serial No. 275,660.

The principal object of the present invention is to provide an apparatus for simultaneously operating the four wheel brakes of a motor or other vehicle and at the same time applying them with equal force.

In the accomplishment of this object the device consists essentially of a centrally pivoted actuator carrying a pair of arms which in turn are linked to the brakes. As the actuator is swung on its pivot, for example from the brake pedal, each arm carried thereby is moved in the general direction of the pair of brakes which it is adapted to operate. The links connecting the arms to their respective brakes are thus shifted, and the brakes are consequently operated.

The connection between each arm and the actuator is necessarily of a pivotal nature and is established in a novel manner. The actuator or pivotal member has cups stamped therein at opposite sides of the pivot point. The arms are formed with integral rings which rotably surround the cups and are retained against slipping off the cups by any suitable means.

The invention is fully disclosed by way of example in the following description and in the accompanying drawings, in which—

Figure 1 is a plan view of an automobile frame or chassis equipped with the invention;

Fig. 2 is a side elevation thereof, partly in section;

Fig. 3 is a section on the line 3—3 of Figure 1;

Fig. 4 is a perspective view of the pivoted actuating member;

Fig. 5 is a perspective view of one of the arms; and

Fig. 6 is a perspective view of the retaining plate.

Reference to these views will now be made by use of like characters which are employed to designate corresponding parts throughout.

In Figures 1 and 2 is illustrated a chassis 1 of a motor vehicle provided with a front axle 2 and rear axle 3 which in turn carry road wheels 4 and 5 respectively equipped with brakes 6 and 7 respectively. A transverse bar 8 is bridged across the frame, preferably somewhat rearward of the mid point, and serves as the support of an actuator 9. This member is formed at its ends with cup portions 10, and the mid point thereof is formed with an aperture 11 through which this member is pivotally mounted on the bar 8 by means of a pin 12. Flanges 13 extend outwardly from the rim or upper edge of the cups, and a lug 14 projects outwardly from one of these flanges and is connected by a link 15 to the usual brake pedal 16 mounted on the transmission casing 17.

Arms 18 for operating the brakes are pivotally retained at the ends of the actuator 9 by means of integral rings 19 rotatably surrounding the cups 10. The rings are preferably formed at the mid points of the arms, with the arms tangential thereto. A retaining plate 20 secured to the base of the cups and having substantially the same contour as the actuating member, holds the rings from slipping off the cups. Finally, the ends of the forward arm 18 are connected by links 21 to the forward brakes 6, and the ends of the rearward arm are similarly joined by links 22 to the rear brakes 7.

When it is desired to apply the brakes, the pedal 16 is depressed in the usual manner and the actuator 9 is swung in clockwise direction with reference to Figure 1. The arms 18 are thus shifted away from their respective brakes but are maintained substantially parallel to the axles because of their pivotal attachment to the ends of the actuator. The links 21 and 22 are shifted by the motion of the arms 18, and the brakes are consequently operated.

Although a specific embodiment of the invention has been illustrated and described, it will be understood that various alterations in the details of construction may be made without departing from the scope of the invention as indicated by the appended claims.

What I claim is:—

1. In a brake equalizer and operating device, a centrally pivoted member having cups formed on opposite sides of the pivot point thereof, rings rotatably surrounding said cups, arms integral with said rings, brake operating members extending from said arms, and means for swinging said member.

2. In a brake equalizer and operating device, a centrally pivoted member having cups formed on opposite sides of the pivot point thereof, rings rotatably surrounding said cups, arms having their mid points merging into said rings, brake operating members extending from said arms, and means for swinging said member.

3. In a brake equalizer and operating device, a centrally pivoted member having cups formed on opposite sides of the pivot point thereof, flanges at the open edges of said cups, rings surrounding said cups, arms integral with said rings, a plate secured to the base of said cups and retaining said rings, brake operating members extending from said arms, and means for swinging said member.

4. In a brake equalizer and operating device, a centrally pivoted member having cups formed on opposite sides of the pivot point thereof, flanges at the open edges of said cups, rings surrounding said cups, arms having their mid points merging into said rings, a plate secured to the base of said cups and retaining said rings, brake operating members extending from said arms, and means for swinging said member.

In testimony whereof I affix my signature.

FREEMAN J. BRADLEY.